US012698841B2

(12) United States Patent
Funakubo et al.

(10) Patent No.: US 12,698,841 B2
(45) Date of Patent: Aug. 4, 2026

(54) RELIEF VALVE

(71) Applicant: KAWASAKI JUKOGYO KABUSHIKI KAISHA, Kobe (JP)

(72) Inventors: Yuko Funakubo, Kobe (JP); Hiroaki Fujiwara, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 98 days.

(21) Appl. No.: 18/728,437

(22) PCT Filed: Dec. 21, 2022

(86) PCT No.: PCT/JP2022/047039
§ 371 (c)(1),
(2) Date: Jul. 11, 2024

(87) PCT Pub. No.: WO2023/136066
PCT Pub. Date: Jul. 20, 2023

(65) Prior Publication Data
US 2025/0075815 A1     Mar. 6, 2025

(30) Foreign Application Priority Data
Jan. 17, 2022     (JP) ................................. 2022-005313

(51) Int. Cl.
*F16K 17/06*     (2006.01)
*F15B 13/02*     (2006.01)

(52) U.S. Cl.
CPC ............ *F16K 17/06* (2013.01); *F15B 13/024* (2013.01)

(58) Field of Classification Search
CPC .... F16K 17/06; F16K 17/065; F16K 27/0254; F16K 31/1222; Y10T 137/7769; F15B 13/024; F15B 13/042
USPC ......................................................... 137/492
See application file for complete search history.

(56) References Cited

U.S. PATENT DOCUMENTS 4,476,890 A * 10/1984 Kawasaki ............. F16K 17/105
137/493.9
6,142,176 A     11/2000 Sagawa et al.
6,318,406 B1 * 11/2001 Conley ................... F16K 17/10
251/38

(Continued)

FOREIGN PATENT DOCUMENTS

EP            1781952 B1     9/2011
JP       H11351425 A     12/1999

(Continued)

OTHER PUBLICATIONS

Ministry of Intellectual Property (MOIP), Office Action Issued in Application No. 10-2024-7021745, Mar. 12, 2026, Korea, 9 Pages.

*Primary Examiner* — William M Mccalister
(74) *Attorney, Agent, or Firm* — Alleman Hall LLP

(57)        ABSTRACT
A relief valve includes a piston including a first piston member to press an urging member using a pressure of pilot oil in a pilot chamber to change an amount of deflection of the urging member. The first piston member includes a first pressure receiving surface to receive a pressure in a first axial direction of an axial direction from hydraulic oil in a first oil chamber, and a second pressure receiving surface to receive a pressure in a second axial direction of the axial direction from the hydraulic oil in a second oil chamber.

10 Claims, 5 Drawing Sheets

(56)                    References Cited

U.S. PATENT DOCUMENTS

|  |  |  |  |  |
|---|---|---|---|---|
| 6,745,792 | B2 * | 6/2004 | Koo | F16K 17/105 |
|  |  |  |  | 137/614.2 |
| 7,000,891 | B2 * | 2/2006 | Rocca | F16K 27/041 |
|  |  |  |  | 137/15.21 |
| 7,819,130 | B2 * | 10/2010 | Krug-Kussius | F15B 13/022 |
|  |  |  |  | 137/493 |
| 8,733,391 | B2 * | 5/2014 | Jeon | F16K 17/10 |
|  |  |  |  | 137/488 |
| 8,746,276 | B2 * | 6/2014 | Bill | B66F 9/22 |
|  |  |  |  | 251/129.08 |
| 10,228,709 | B2 * | 3/2019 | Bruck | F15B 13/024 |
| 10,533,584 | B1 * | 1/2020 | Zähe | F16K 17/105 |
| 10,557,483 | B1 * | 2/2020 | Zahe | F15B 13/0426 |
| 10,774,853 | B2 * | 9/2020 | Zähe | F16K 17/168 |
| 10,775,812 | B1 * | 9/2020 | Zähe | F16K 17/044 |
| 2003/0094201 | A1 * | 5/2003 | Slawinski | F16K 17/105 |
|  |  |  |  | 137/488 |
| 2003/0111114 | A1 * | 6/2003 | Koo | F16K 17/105 |
|  |  |  |  | 137/491 |
| 2005/0178443 | A1 * | 8/2005 | Cheong | F16K 17/105 |
|  |  |  |  | 137/491 |
| 2005/0183775 | A1 * | 8/2005 | Cheong | F15B 13/024 |
|  |  |  |  | 137/491 |
| 2007/0245889 | A1 | 10/2007 | Breunig et al. |  |
| 2009/0211650 | A1 * | 8/2009 | Jeon | G05D 16/187 |
|  |  |  |  | 137/488 |
| 2009/0241765 | A1 * | 10/2009 | Matsuo | F15B 13/01 |
|  |  |  |  | 91/418 |
| 2014/0069529 | A1 | 3/2014 | Matsuo et al. |  |
| 2016/0091101 | A1 * | 3/2016 | Neubauer | F16K 11/0716 |
|  |  |  |  | 137/625.18 |

FOREIGN PATENT DOCUMENTS

| JP | 2000120899 A | 4/2000 |
|---|---|---|
| JP | 2005282699 A | 10/2005 |
| JP | 2012255484 A | 12/2012 |

* cited by examiner

FIG.2

RELIEF VALVE

TECHNICAL FIELD

The present disclosure relates to a relief valve, and more particularly, it relates to a relief valve that changes the amount of deflection of an urging member using the pressure of pilot oil.

BACKGROUND ART

Conventionally, a relief valve that changes the amount of deflection of an urging member using the pressure of pilot oil is known. Such a relief valve is described in European Patent No. 1781952, for example.

European Patent No. 1781952 discloses a relief valve for a hydraulic controller. The relief valve includes a valve slide that blocks a connection between an inlet terminal and a tank terminal, a pilot valve cone that presses the valve slide, a control spring that presses the valve slide in a closing direction through the pilot valve cone, and a tensioning piston that presses the control spring using a pilot pressure and changes the amount of deflection of the control spring. A force due to the pilot pressure acts on the tensioning piston in a first axial direction of an axial direction. The tensioning piston changes the amount of deflection of the control spring to adjust a relief pressure.

The pilot valve cone a includes passage passing therethrough in the axial direction, and an end of the pilot valve cone in a second axial direction of the axial direction is inserted into a recess of the tensioning piston. Through the passage of the pilot valve cone, a pressure fluid is guided into a control chamber defined by the recess of the tensioning piston and the end of the pilot valve cone in the second axial direction.

PRIOR ART

Patent Document

Patent Document 1: European Patent No. 1781952

SUMMARY OF THE INVENTION

Problem to be Solved by the Invention

However, in the relief valve described in European Patent No. 1781952, the pressure fluid is guided into the control chamber, and thus a force due to the pressure of the pressure fluid in the control chamber acts on the tensioning piston in the second axial direction against the pilot pressure. In this case, when it is attempted to adjust the relief pressure using the pilot pressure, a pressure sufficient to push back the force due to the pressure of the pressure fluid is required as the pilot pressure. Therefore, it is difficult to adjust the relief pressure while reducing a pressure required as the pilot pressure.

The present disclosure is intended to solve the above problem. The present disclosure aims to provide a relief valve capable of adjusting a relief pressure while reducing a pressure required as a pilot pressure.

In order to attain the aforementioned object, a relief valve according to a first aspect of the present disclosure includes a housing including a pilot chamber and an oil chamber therein, a valve body to allow or block communication between an inflow passage into which hydraulic oil flows and an outflow passage through which the hydraulic oil flows out, the valve body including a first surface facing the inflow passage, a second surface facing the oil chamber, and a through passage connecting the first surface to the second surface, an urging member to urge the valve body toward the inflow passage, and a piston including a first piston member to press the urging member using a pressure of pilot oil in the pilot chamber to change an amount of deflection of the urging member. The first piston member is at least partially located within the oil chamber, and is operable to divide the oil chamber into a first oil chamber and a second oil chamber, and the first piston member includes a first pressure receiving surface to receive a pressure in a first axial direction of an axial direction from the hydraulic oil in the first oil chamber, and a second pressure receiving surface to receive a pressure in a second axial direction of the axial direction from the hydraulic oil in the second oil chamber.

In the relief valve according to the first aspect of the present disclosure, as described above, the first piston member includes the first pressure receiving surface to receive a pressure in the first axial direction from the hydraulic oil in the first oil chamber, and the second pressure receiving surface to receive a pressure in the second axial direction from the hydraulic oil in the second oil chamber. Accordingly, a force that acts on the first piston member in the first axial direction due to the pressure of the hydraulic oil can be opposed to a force that acts on the first piston member in the second axial direction due to the pressure of the hydraulic oil, and thus the force that acts in the second axial direction against the pressure of the pilot oil can be reduced. Consequently, the pressure of the pilot oil does not need to be high enough to push back all of the force that acts on the first piston member in the second axial direction due to the pressure of the hydraulic oil. Thus, the relief pressure can be adjusted while a pressure required as the pilot pressure is reduced.

A relief valve according to a second aspect of the present disclosure includes a housing including a pilot chamber, an oil chamber, and an atmospheric open chamber therein, a valve body to allow or block communication between an inflow passage into which hydraulic oil flows and an outflow passage through which the hydraulic oil flows out, the valve body including a first surface facing the inflow passage, a second surface facing the oil chamber, and a through passage connecting the first surface to the second surface, an urging member to urge the valve body toward the inflow passage, and a piston including a first pilot piston member to change an amount of deflection of the urging member using a pressure of pilot oil in the pilot chamber. A surface of the first pilot piston member in a second axial direction of an axial direction faces the pilot chamber, and a surface of the first pilot piston member in a first axial direction of the axial direction faces the atmospheric open chamber.

In the relief valve according to the second aspect of the present disclosure, as described above, the surface of the first pilot piston member in the second axial direction faces the pilot chamber, and the surface of the first pilot piston member in the first axial direction faces the atmospheric open chamber. Accordingly, unlike a case in which the surface of the first pilot piston member in the first axial direction faces the back pressure chamber, the surface of the first pilot piston member in the first axial direction is open to the atmosphere, and thus a force can be prevented from acting in the second axial direction against the pressure of the pilot oil on the surface of the first pilot piston member in the first axial direction due to the back pressure. Consequently, the relief pressure can be adjusted while a pressure required as the pilot pressure is reduced. Furthermore, the influence of the back pressure can be reduced, and thus the relief pressure can be accurately adjusted even when the back pressure varies rapidly.

Effect of the Invention

According to the present disclosure, it is possible to adjust the relief pressure while reducing a pressure required as the pilot pressure.

BRIEF DESCRIPTION OF THE DRAWINGS

FIG. 2 is a partially enlarged view of FIG. 1.

MODES FOR CARRYING OUT THE INVENTION

Embodiments of the present disclosure are hereinafter described on the basis of the drawings.

First Embodiment

The configuration of a relief valve 100 according to a first embodiment is now described with reference to FIGS. 1 and 2. In the figures, a Z direction represents an axial direction, a Z1 direction represents a first axial direction of the axial direction, and a Z2 direction represents a second axial direction of the axial direction. Moreover, a Y direction represents a radial direction perpendicular to the axial direction.

Figure 1:
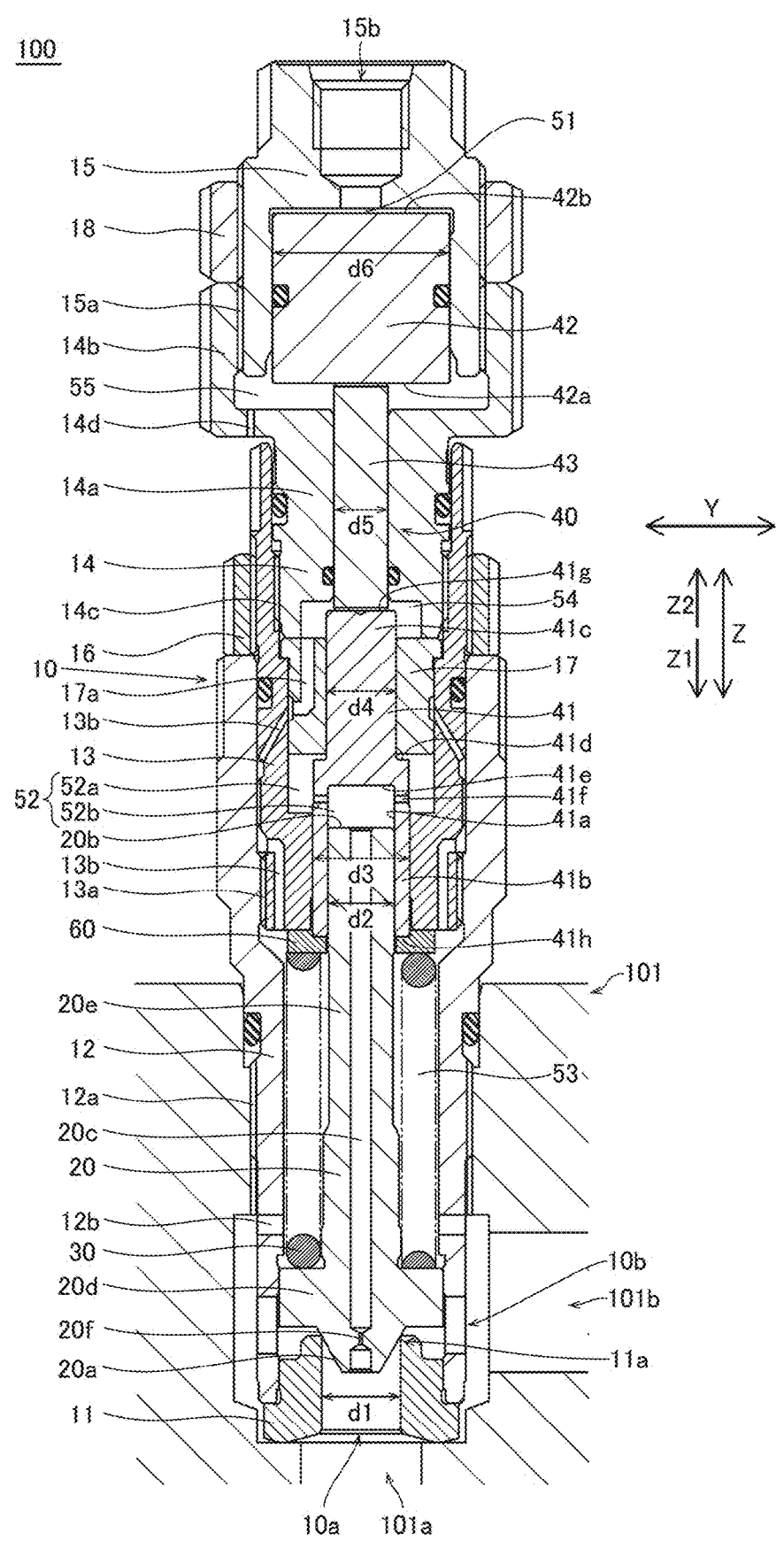
FIG. 1 is a longitudinal sectional view showing a relief valve according to a first embodiment.

The relief valve 100 shown in FIG. 1 regulates the maximum pressure in a hydraulic circuit through which hydraulic oil flows. The relief valve 100 is used in construction machinery vehicles, industrial vehicles, etc. As described below, the relief valve 100 is a direct-acting and differential pressure relief valve, and is a variable relief valve that can adjust a relief pressure. The relief valve 100 is attached to a valve block 101.

The relief valve 100 includes a housing 10, a valve body 20, an urging member 30, and a piston 40. The valve body 20, the urging member 30, and the piston 40 are housed inside the housing 10. The relief valve 100 is not a balanced piston relief valve including a main valve and a child valve, but a direct-acting relief valve including one valve body 20. Therefore, the structure of the relief valve 100 can be simplified as compared with a balanced piston relief valve having a large number of components and a complex structure. Thus, it is possible to reduce the possibility that foreign matter such as dust mixed in the hydraulic oil gets caught in a gap between components of the relief valve 100.

The housing 10 is attached to the valve block 101. The valve block 101 includes an inflow passage 101a into which the hydraulic oil flows, and an outflow passage 101b through which the hydraulic oil flows out. The inflow passage 101a is connected to an inlet port. High-pressure hydraulic oil of the hydraulic circuit flows into the inflow passage 101a. An inlet pressure in the relief valve 100 acts on the inflow passage 101a. The outflow passage 101b is connected to an outlet port. A back pressure in the relief valve 100 acts on the outflow passage 101b. For example, when the outflow passage 101b is connected to a tank of the hydraulic circuit, the back pressure in the relief valve 100 is equal to a tank pressure.

The housing 10 includes a valve seat member 11 and housing members 12 to 15. The valve seat member 11 and the housing members 12 to 15 are arranged approximately in this order from the first axial direction side toward the second axial direction side, and define the exterior of the relief valve 100 as a whole.

The valve seat member 11 includes a valve seat 11a. The valve seat 11a surrounds a passage 10a connected to the inflow passage 101a. The valve body 20 is seated on and separated from the valve seat 11a. The valve seat 11a is provided at an end of the annular valve seat member 11 in the second axial direction. The passage 10a is provided as an inner hole of the valve seat member 11. The valve seat member 11 may be omitted, and in this case, the valve seat 11a may be provided directly on the valve block 101.

The housing member 12 is a cylindrical member extending along the axial direction. The valve seat member 11 is attached to an end of the housing member 12 in the first axial direction. Furthermore, a passage 10b connected to the outflow passage 101b is provided on a side surface of the end of the housing member 12 in the first axial direction. The housing member 12 is screwed onto the valve block 101 via a screw 12a.

The housing member 13 is a cylindrical member extending along the axial direction. The diameter of at least a portion of the housing member 13 is smaller than the diameter of the housing member 12. A portion of the housing member 13 in the first axial direction is inserted into an inner hole of the housing member 12 in the first axial direction, and is screwed into the inner hole of the housing member 12 via a screw 13a. A portion of the housing member 13 in the second axial direction protrudes from the inner hole of the housing member 12 in the second axial direction, and a nut 16 is screwed onto the outer periphery. The housing member 13 is fastened to the housing member 12 by the nut 16. Furthermore, a cylindrical holding member 17 into which a first piston member 41 (described below) of the piston 40 is fitted is arranged in an inner hole of the housing member 13. The first piston member 41 is fitted into an inner hole of the holding member 17, and the outer periphery of the holding member 17 is fitted to the housing member 13.

The housing member 14 includes a small diameter structure 14a and a large diameter structure 14b having a larger diameter than the small diameter structure 14a. Both the small diameter structure 14a and the large diameter structure 14b have a cylindrical shape extending along the axial direction. The small diameter structure 14a is inserted into the inner hole of the housing member 13 in the first axial direction, is screwed into the inner hole of the housing member 13 via a screw 14c, and is fastened to the housing member 13 via the holding member 17. The large diameter structure 14b is connected to a portion of the small diameter structure 14a in the second axial direction, and protrudes from the inner hole of the housing member 13 in the second axial direction.

The housing member 15 is inserted into an inner hole of the large diameter structure 14b in the first axial direction, and is screwed to the large diameter structure 14b via a screw 15a. Furthermore, the housing member 15 protrudes from the inner hole of the large diameter structure 14b in the second axial direction, and a nut 18 is screwed onto the outer periphery. The housing member 15 is fastened to the housing member 14 by the nut 18. The housing member 15 includes a pilot port 15b to supply pilot oil. The pressure of the pilot oil is a pressure for operating objects to be operated includ-
ing the relief valve 100 in the hydraulic circuit. In this
embodiment, the hydraulic oil of a main circuit for driving
an actuator etc. is simply called "hydraulic oil", and the
hydraulic oil for operation is called "pilot oil".

Inside the housing 10, a pilot chamber 51 into which the
pressure of the pilot oil is introduced, an oil chamber 52 into
which the pressure of the hydraulic oil is introduced, an
urging member chamber 53 in which the urging member 30
is arranged, a back pressure chamber 54, and an atmospheric
open chamber 55 opened to the atmosphere are provided.
The pilot chamber 51 is connected to the pilot port 15b.
Therefore, the pressure of the pilot oil in the pilot port 15b
acts on the pilot chamber 51. Furthermore, the pilot chamber
51 is defined by a concave structure of the housing member
15 and a second piston member 42 (described below) of the
piston 40. The oil chamber 52 is connected to a through
passage 20c (described below) of the valve body 20. There-
fore, the inlet pressure in the relief valve 100 acts on the oil
chamber 52. Furthermore, the oil chamber 52 is defined by
the housing member 13 and a first piston member 41
(described below) of the piston 40.

The urging member chamber 53 is connected to the
outflow passage 101b via a passage 12b of the housing
member 12. Therefore, the back pressure in the relief valve
100 acts on the urging member chamber 53. Furthermore,
the urging member chamber 53 is defined by the housing
member 12 and the valve body 20.

The back pressure chamber 54 is connected to the urging
member chamber 53 via a passage 13b of the housing
member 13 and a passage 17a of the holding member 17.
Therefore, the back pressure in the relief valve 100 acts on
the back pressure chamber 54. Furthermore, the back pres-
sure chamber 54 is defined by the housing member 14, the
holding member 17, and the first piston member 41 and a
third piston member 43 (described below) of the piston 40.

The atmospheric open chamber 55 is connected to the
atmosphere via a passage 14d of the housing member 14.
Therefore, the pressure of the hydraulic oil does not act on
the atmospheric open chamber 55. Furthermore, the atmo-
spheric open chamber 55 is defined by the housing member
14, the housing member 15, and the second piston member
42 and the third piston member 43 (described below) of the
piston 40.

The urging member chamber 53, the oil chamber 52, the
back pressure chamber 54, the atmospheric open chamber
55, and the pilot chamber 51 are arranged in this order from
the first axial direction side toward the second axial direction
side. The urging member chamber 53 is arranged at a
position overlapping a portion of the valve body 20 in the
radial direction. The oil chamber 52 is arranged in the
second axial direction with respect to the urging member
chamber 53, and is arranged at a position overlapping a
portion of the first piston member 41 of the piston 40 in the
radial direction. The back pressure chamber 54 is arranged
in the second axial direction with respect to the oil chamber
52, and is arranged at a position overlapping a portion of the
first piston member 41 and a portion of the third piston
member 43 of the piston 40 in the radial direction. The
atmospheric open chamber 55 is arranged in the second axial
direction with respect to the back pressure chamber 54, and
is arranged at a position overlapping a portion of the second
piston member 42 and a portion of the third piston member
43 of the piston 40 in the radial direction. The pilot chamber
51 is arranged in the second axial direction with respect to
the atmospheric open chamber 55. Furthermore, at least a portion of the pilot chamber 51 is arranged in the second
axial direction with respect to the second piston member 42
of the piston 40.

The valve body 20 allows or blocks communication
between the inflow passage 101a and the outflow passage
101b. The valve body 20 includes a first surface 20a facing
the inflow passage 101a, a second surface 20b facing a
second oil chamber 52b (described below) of the oil cham-
ber 52, and the through passage 20c connecting the first
surface 20a to the second surface 20b. Furthermore, the
valve body 20 includes an enlarged structure 20d seated on
the valve seat 11a, and a shaft 20e extending in the second
axial direction from the enlarged structure 20d. The first
surface 20a is formed on an end surface of the enlarged
structure 20d of the valve body 20 in the first axial direction.
The second surface 20b is formed on an end surface of the
shaft 20e in the second axial direction. The through passage
20c passes through the valve body 20 in the axial direction
from the first surface 20a to the second surface 20b, and
guides the hydraulic oil in the inflow passage 101a to the
second oil chamber 52b of the oil chamber 52. Furthermore,
a throttle 20f is provided in the through passage 20c. This
throttle 20f reduces or prevents a sudden change in a
pressure in the oil chamber 52.

The relief valve 100 is of a differential pressure type that
cancels the pressure receiving area of the valve body 20 by
guiding the hydraulic oil through the through passage 20c.
Specifically, the valve body 20 receives a pressure in the
second axial direction from the hydraulic oil in the inflow
passage 101a on the first surface 20a, and receives a
pressure in the first axial direction from the hydraulic oil in
the oil chamber 52 on the second surface 20b. Therefore, the
effective pressure receiving area of the valve body 20 is an
area obtained by subtracting the pressure receiving area of
the second surface 20b from the pressure receiving area of
the first surface 20a. That is, the effective pressure receiving
area of the valve body 20 is expressed by the following
equation (1). Furthermore, the relief valve 100 is of a
differential pressure type, and thus the urging member 30
can be downsized even when a large flow rate of hydraulic
oil flows, and it is also possible to cope with a large flow
rate.

$$A1 = (d1^2 - d2^2) \times \pi / 4 \qquad (1)$$

In the equation (1), A1 represents the effective pressure
receiving area of the valve body 20, d1 represents the
diameter of the first surface 20a facing the inflow passage
101a, and d2 represents the diameter of the second surface
20b facing the oil chamber 52.

The urging member 30 urges the valve body 20 toward the
inflow passage 101a and the valve seat 11a, and sets a relief
pressure. The urging member 30 is arranged in the first axial
direction with respect to the first piston member 41 of the
piston 40 and the housing member 13 in the relief valve 100.
The urging member 30 is a coil spring. However, the urging
member 30 is not limited to a coil spring, and may be a leaf
spring, for example. The urging member 30 is held between
a spring seat 60 and the enlarged structure 20d within the
urging member chamber 53. The urging member 30 is
compressed within the urging member chamber 53 so as to
press the spring seat 60 in the second axial direction and the
enlarged structure 20d in the first axial direction. In the relief
valve 100, when the pressure of the hydraulic oil in the
inflow passage 101a increases to the relief pressure, the valve body 20 moves in the second axial direction against the urging force of the urging member 30, and the inflow passage 101*a* and the outflow passage 101*b* are connected to each other. Thus, the hydraulic oil flows out, and the inlet pressure and flow rate of the relief valve 100 are controlled.

The piston 40 is provided to variably adjust the relief pressure. Specifically, the piston 40 presses the urging member 30 using the pressure of the pilot oil in the pilot chamber 51, and changes the amount of deflection of the urging member 30. Accordingly, the piston 40 variably adjusts the relief pressure according to the pressure of the pilot oil. As the urging member 30 is deflected, the urging force of the urging member 30 that urges the valve body 20 increases, and the relief pressure is adjusted to be higher. The piston 40 can variably adjust the relief pressure within a set pressure range.

A basic relief pressure is adjusted by the housing member 13. Specifically, the amount of deflection of the urging member 30 is changed according to the insertion amount of the housing member 13 into the housing member 12 by the screw 13*a*. The housing member 13 is fixed by the nut 16 such that the basic relief pressure is set. The piston 40 variably adjusts the relief pressure while the basic relief pressure is adjusted by the housing member 13.

The movable range of the piston 40, i.e., a range in which the relief pressure is variably adjusted by deflecting the urging member 30, is adjusted by the housing member 15. Specifically, the movable range of the second piston member 42 including the housing member 14 and the housing member 15 is set according to the insertion amount of the housing member 15 into the housing member 14 by the screw 15*a*. The housing member 15 is fixed by the nut 18 such that the movable range of the second piston member 42 is set, and the range in which the piston 40 deflects the urging member 30 to variably adjust the relief pressure is adjusted.

Figure 2:
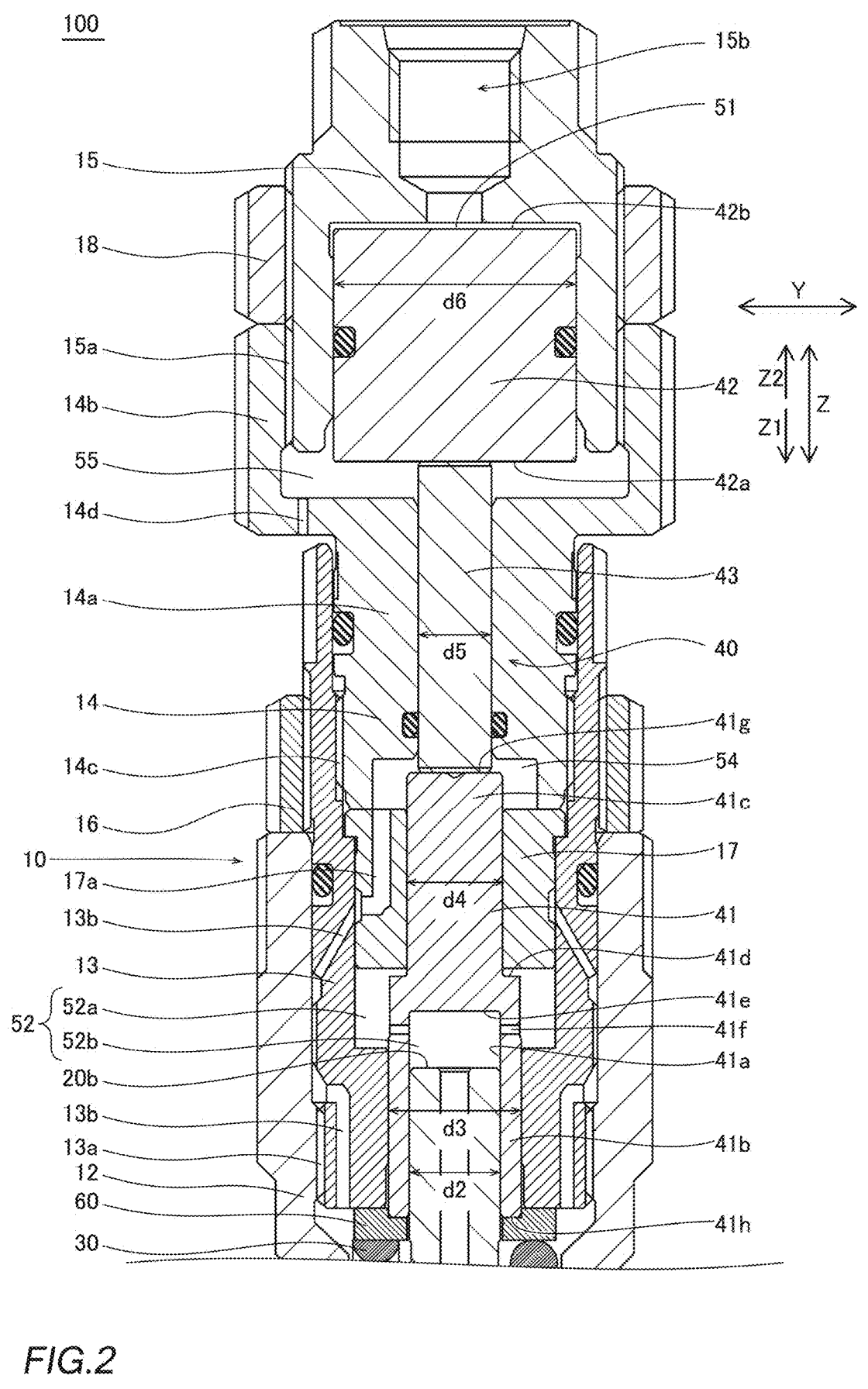

As shown in FIGS. 1 and 2, the piston 40 includes the first piston member 41, the second piston member 42, and the third piston member 43. The first piston member 41, the second piston member 42, and the third piston member 43 are separate components. The first piston member 41 is arranged on the first axial direction in the piston 40, and presses the urging member 30 in the first axial direction via the spring seat 60. The first piston member 41 includes an annular structure 41*b* including a concave structure 41*a* that is recessed in the second axial direction and into which an end of the shaft 20*e* of the valve body 20 in the second axial direction is inserted, and a convex structure 41*c* having a smaller diameter than the annular structure 41*b* and protruding from the annular structure 41*b* in the second axial direction. The annular structure 41*b* is slidably fitted into the inner hole of the housing member 13 in a liquid-tight manner. Furthermore, the end of the shaft 20*e* of the valve body 20 in the second axial direction is slidably fitted into the concave structure 41*a* of the annular structure 41*b* in a fluid-tight manner. The convex structure 41*c* is slidably fitted into the inner hole of the holding member 17 in a liquid-tight manner. The second piston member 42 is an example of a first pilot piston member. The third piston member 43 is an example of a second pilot piston member.

The second piston member 42 is arranged in the second axial direction in the piston 40 and receives a pressure in the first axial direction from the pilot oil in the pilot chamber 51. The second piston member 42 presses and moves the first piston member 41 in the first axial direction via the third piston member 43. The second piston member 42 has a larger diameter than the first piston member 41 and the third piston member 43. The second piston member 42 is slidably fitted into the concave structure of the housing member 15 that is recessed in the second axial direction.

The third piston member 43 is arranged between the first piston member 41 and the second piston member 42 in the axial direction, and when pressed by the second piston member 42, the third piston member 43 presses and moves the first piston member 41 in the first axial direction. The third piston member 43 has a smaller diameter than the convex structure 41*c* of the first piston member 41 and the third piston member 43. The second piston member 42 is slidably fitted into an inner hole of the small diameter structure 14*a*.

In the first embodiment, the first piston member 41 is at least partially located within the oil chamber 52, and divides the oil chamber 52 into a first oil chamber 52*a* and the second oil chamber 52*b*. The first piston member 41 includes a first pressure receiving surface 41*d* that receives a pressure in the first axial direction from the hydraulic oil in the first oil chamber 52*a*, and a second pressure receiving surface 41*e* that receives a pressure in the second axial direction from the hydraulic oil in the second oil chamber 52*b*. In the first embodiment, as viewed in the axial direction, the first pressure receiving surface 41*d* is an annular surface between the outer periphery of the annular structure 41*b* and the outer periphery of the convex structure 41*c*. The annular surface faces the first oil chamber 52*a*. Furthermore, the second pressure receiving surface 41*e* is a surface of the concave structure 41*a* facing the second surface 20*b*. The facing surface of the concave structure 41*a* faces the second oil chamber 52*b*. The facing surface of the concave structure 41*a* is a surface of the concave structure 41*a* defined by the diameter d2, and in the first embodiment, it is the bottom surface of the concave structure 41*a*.

The first oil chamber 52*a* is located radially outward of the annular structure 41*b*, and is defined by the annular structure 41*b*, the holding member 17, and the housing member 13. The second oil chamber 52*b* is located radially inward of the annular structure 41*b*, and is defined by the concave structure 41*a* and the end of the shaft 20*e* of the valve body 20 in the second axial direction. The first piston member 41 includes a communication hole 41*f* that allows the first oil chamber 52*a* and the second oil chamber 52*b* to be connected to each other. The communication hole 41*f* is provided in the annular structure 41*b* and passes through the annular structure 41*b* in the radial direction. The inlet pressure in the relief valve 100 is introduced into the second oil chamber 52*b* from the inflow passage 101*a* through the through passage 20*c*. Furthermore, the inlet pressure in the relief valve 100 is introduced into the first oil chamber 52*a* from the second oil chamber 52*b* through the communication hole 41*f*.

In the first embodiment, in the first piston member 41, the pressure receiving area of the first pressure receiving surface 41*d* is equal to the pressure receiving area of the second pressure receiving surface 41*e*. In this embodiment, the expression that the pressure receiving area of the first pressure receiving surface 41*d* is equal to the pressure receiving area of the second pressure receiving surface 41*e* indicates that the area ratio of the first pressure receiving surface 41*d* to the second pressure receiving surface 41*e* is 0.9 to 1.1. When the pressure receiving area of the first pressure receiving surface 41*d* is equal to the pressure receiving area of the second pressure receiving surface 41*e*, the effective pressure receiving area of the first piston member 41 due to the first pressure receiving surface 41*d* and the second pressure receiving surface 41*e* is zero or about zero. In this case, an axial force that acts on the first piston member 41 due to the pressure of the hydraulic oil can be reduced or prevented.

This point is described using mathematical formulas. The inlet pressure in the relief valve 100 acts on the first oil chamber 52$a$, and thus a force that acts on the first pressure receiving surface 41$d$ due to the pressure of the hydraulic oil in the first oil chamber 52$a$ is expressed by the following equation (2). Furthermore, the inlet pressure in the relief valve 100 acts on the second oil chamber 52$b$, and thus a force that acts on the second pressure receiving surface 41$e$ due to the pressure of the hydraulic oil in the second oil chamber 52$b$ is expressed by the following equation (3). When the first axial direction is defined as a positive direction, a total force that acts on the first piston member 41 due to the pressure of the hydraulic oil is expressed by an equation (4). When the pressure receiving area of the first pressure receiving surface 41$d$ is equal to the pressure receiving area of the second pressure receiving surface 41$e$, the effective pressure receiving area becomes zero or about zero, as expressed by the following equation (5), and thus a force that acts on the first piston member 41 due to the pressure of the hydraulic oil can be reduced or prevented. The inner diameter d2 of the annular structure 41$b$, the outer diameter d3 of the annular structure 41$b$, and the diameter d4 of the convex structure 41$c$ are set so as to reduce or prevent the influence of the pressure of the hydraulic oil that acts on the first piston member 41.

$$(d3^2 - d4^2) \times \pi/4 \times PP \qquad (2)$$

$$d2^2 \times \pi/4 \times PP \qquad (3)$$

$$(d3^2 - d4^2) \times \pi/4 \times PP - d2^2 \times \pi/4 \times PP = \qquad (4)$$

$$(d3^2 - d4^2 - d2^2) \times \pi/4 \times PP$$

$$A2 = (d3^2 - d4^2 - d2^2) \times \pi/4 \approx 0 \qquad (5)$$

In the equations (2) to (5), d2 represents the inner diameter of the annular structure 41$b$, d3 represents the outer diameter of the annular structure 41$b$, d4 represents the diameter of the convex structure 41$c$, PP represents the inlet pressure in the relief valve 100, and A2 represents the effective pressure receiving area of the first piston member 41 with respect to the inlet pressure in the relief valve 100.

In the first embodiment, the first piston member 41 includes a third pressure receiving surface 41$g$ that receives a pressure in the first axial direction from the hydraulic oil in the back pressure chamber 54, and a fourth pressure receiving surface 41$h$ that receives a pressure in the second axial direction from the hydraulic oil in the urging member chamber 53. In the first embodiment, as viewed in the axial direction, the third pressure receiving surface 41$g$ is a surface of the convex structure 41$c$ in the second axial direction. The surface of the convex structure 41$c$ in the second axial direction faces the back pressure chamber 54. Oil passages such as slits are provided on the surface of the convex structure 41$c$ in the second axial direction and on a surface of the third piston member 43 in the first axial direction, and the back pressure of the hydraulic oil in the back pressure chamber 54 acts on each of these surfaces. Furthermore, the fourth pressure receiving surface 41$h$ is a surface of the annular structure 41$b$ in the first axial direction. The surface of the annular structure 41$b$ in the first axial direction receives the back pressure of the hydraulic oil in the urging member chamber 53 via the spring seat 60.

In the first embodiment, in the first piston member 41, the pressure receiving area of the third pressure receiving surface 41$g$ is equal to the pressure receiving area of the fourth pressure receiving surface 41$h$. In this embodiment, the expression that the pressure receiving area of the third pressure receiving surface 41$g$ is equal to the pressure receiving area of the fourth pressure receiving surface 41$h$ indicates that the area ratio of the third pressure receiving surface 41$g$ to the fourth pressure receiving surface 41$h$ is 0.9 to 1.1. When the pressure receiving area of the third pressure receiving surface 41$g$ is equal to the pressure receiving area of the fourth pressure receiving surface 41$h$, the effective pressure receiving area of the first piston member 41 due to the third pressure receiving surface 41$g$ and the fourth pressure receiving surface 41$h$ is zero or about zero. In this case, the axial force that acts on the first piston member 41 due to the pressure of the hydraulic oil can be reduced or prevented.

This point is described using mathematical formulas. The back pressure in the relief valve 100 acts on the back pressure chamber 54, and thus a force that acts on the third pressure receiving surface 41$g$ due to the pressure of the hydraulic oil in the back pressure chamber 54 is expressed by the following equation (6). Furthermore, the back pressure in the relief valve 100 acts on the urging member chamber 53, and thus a force that acts on the fourth pressure receiving surface 41$h$ due to the back pressure of the hydraulic oil in the urging member chamber 53 is expressed by the following equation (7). When the second axial direction is the positive direction, a total force that acts on the first piston member 41 due to the back pressure of the hydraulic oil is expressed by an equation (8). When the pressure receiving area of the third pressure receiving surface 41$g$ is equal to the pressure receiving area of the fourth pressure receiving surface 41$h$, the effective pressure receiving area becomes zero or about zero, as expressed by the following equation (9), and thus a force that acts on the first piston member 41 due to the back pressure of the hydraulic oil can be reduced or prevented. The inner diameter d2 of the annular structure 41$b$, the outer diameter d3 of the annular structure 41$b$, and the diameter d4 of the convex structure 41$c$ are set so as to reduce or prevent the influence of the back pressure of the hydraulic oil that acts on the first piston member 41.

$$d4^2 \times \pi/4 \times PR \qquad (6)$$

$$(d3^2 - d2^2) \times \pi/4 \times PR \qquad (7)$$

$$(d3^2 - d2^2) \times \pi/4 \times PR - d4^2 \times \pi/4 \times PR = \qquad (8)$$

$$(d3^2 - d2^2 - d4^2) \times \pi/4 \times PR$$

$$A3 = (d3^2 - d2^2 - d4^2) \times \pi/4 \approx 0 \qquad (9)$$

In the equations (6) to (9), d2 represents the inner diameter of the annular structure 41$b$, d3 represents the outer diameter of the annular structure 41$b$, d4 represents the diameter of the convex structure 41$c$, PR represents the back pressure in the relief valve 100, and A3 represents the effective pressure receiving area of the first piston member 41 with respect to the back pressure in the relief valve 100.

In the first embodiment, the second piston member 42 includes an atmospheric open surface 42$a$ facing the atmospheric open chamber 55 in the first axial direction, and a pilot pressure receiving surface 42*b* facing the pilot chamber 51 in the second axial direction. The atmospheric open surface 42*a* is a surface of the second piston member 42 in the first axial direction, and is in contact with the atmosphere within the atmospheric open chamber 55. The atmospheric open surface 42*a* does not receive a pressure in the second axial direction from the hydraulic oil. The pilot pressure receiving surface 42*b* is a surface of the second piston member 42 in the second axial direction, and receives a pressure in the first axial direction from the pilot oil within the pilot chamber 51. The second piston member 42 includes the atmospheric open surface 42*a* facing the atmospheric open chamber 55 so as to be less likely to be pushed back by the back pressure in the relief valve 100 that opposes the pressure of the pilot oil.

In the first embodiment, the surface of the third piston member 43 in the first axial direction faces the back pressure chamber 54. The surface of the third piston member 43 in the first axial direction receives a back pressure in the second axial direction from the hydraulic oil within the back pressure chamber 54. The area of the surface of the third piston member 43 in the first axial direction is smaller than the area of the pilot pressure receiving surface 42*b*. That is, the relationship between the area of the surface of the third piston member 43 in the first axial direction and the area of the pilot pressure receiving surface 42*b* is expressed by the following equation (10). The diameter d6 of the second piston member 42 and the diameter d5 of the third piston member 43 are set so as to reduce the influence of the back pressure that acts on the second piston member 42.

$$d5^2 \times \pi/4 < d6^2 \times \pi/4 \qquad (10)$$

In the equation (10), d5 represents the diameter of the third piston member 43, and d6 represents the diameter of the second piston member 42.

The area of the pilot pressure receiving surface 42*b* of the second piston member 42 can be changed by changing the diameter d6. That is, in the relief valve 100, the area of the pilot pressure receiving surface 42*b* can be changed by changing the second piston member 42 to a second piston member 42 having a different diameter d6. Thus, it is possible to change a slope between the pressure of the pilot oil and the relief pressure, and thus it is possible to configure a relief valve 100 having a different slope between the pressure of the pilot oil and the relief pressure.

Advantages of First Embodiment

According to the first embodiment, the following advantages are achieved.

According to the first embodiment, as described above, the relief valve 100 includes the housing 10 including the pilot chamber 51 and the oil chamber 52 therein, the valve body 20 to allow or block communication between the inflow passage 101*a* into which hydraulic oil flows and the outflow passage 101*b* through which the hydraulic oil flows out and including the first surface 20*a* facing the inflow passage 101*a*, the second surface 20*b* facing the oil chamber 52, and the through passage 20*c* connecting the first surface 20*a* to the second surface 20*b*, the urging member 30 to urge the valve body 20 toward the inflow passage 101*a*, and the piston 40 including the first piston member 41 to press the urging member 30 using the pressure of the pilot oil in the pilot chamber 51 to change the amount of deflection of the urging member 30. The first piston member 41 is at least partially located within the oil chamber 52, and is operable to divide the oil chamber 52 into the first oil chamber 52*a* and the second oil chamber 52*b*. Furthermore, the first piston member 41 includes the first pressure receiving surface 41*d* to receive a pressure in the first axial direction from the hydraulic oil in the first oil chamber 52*a*, and the second pressure receiving surface 41*e* to receive a pressure in the second axial direction from the hydraulic oil in the second oil chamber 52*b*.

With the configuration described above, the force that acts on the first piston member 41 in the first axial direction due to the pressure of the hydraulic oil can be opposed to the force that acts on the first piston member 41 in the second axial direction due to the pressure of the hydraulic oil, and thus the force that acts in the second axial direction against the pressure of the pilot oil can be reduced. Consequently, the pressure of the pilot oil does not need to be high enough to push back all of the force that acts on the first piston member 41 in the second axial direction due to the pressure of the hydraulic oil. Thus, the relief pressure can be adjusted while a pressure required as the pilot pressure is reduced.

According to the first embodiment, as described above, the relief valve 100 includes the housing 10 including the pilot chamber 51, the oil chamber 52, and the atmospheric open chamber 55 therein, the valve body 20 to allow or block communication between the inflow passage 101*a* into which hydraulic oil flows and the outflow passage 101*b* through which the hydraulic oil flows out and including the first surface 20*a* facing the inflow passage 101*a*, the second surface 20*b* facing the oil chamber 52, and the through passage 20*c* connecting the first surface 20*a* to the second surface 20*b*, the urging member 30 to urge the valve body 20 toward the inflow passage 101*a*, and the piston 40 including the second piston member 42 to change the amount of deflection of the urging member 30 using the pressure of the pilot oil in the pilot chamber. The pilot pressure receiving surface 42*b* of the second piston member 42 in the second axial direction faces the pilot chamber 51, and the atmospheric open surface 42*a* of the second piston member 42 in the first axial direction faces the atmospheric open chamber 55.

With the configuration described above, unlike a case in which the atmospheric open surface 42*a* of the second piston member 42 in the first axial direction faces the back pressure chamber 54, the atmospheric open surface 42*a* of the second piston member 42 in the first axial direction is open to the atmosphere, and thus a force can be prevented from acting in the second axial direction against the pressure of the pilot oil on the atmospheric open surface 42*a* of the second piston member 42 in the first axial direction due to the back pressure. Consequently, the relief pressure can be adjusted while a pressure required as the pilot pressure is reduced. Furthermore, the influence of the back pressure can be reduced, and thus the relief pressure can be accurately adjusted even when the back pressure varies rapidly. Moreover, when the relief valve 100 is used in a slewing structure in which variations in the back pressure are likely to occur during slewing, it is very effective to be able to reduce the influence of the back pressure.

According to the first embodiment, as described above, the first piston member 41 includes the annular structure 41*b* including the concave structure 41*a* that is recessed in the second axial direction and into which the end of the valve body 20 in the second axial direction is inserted, and the convex structure 41*c* having a smaller diameter than the annular structure 41*b* and protruding from the annular structure 41*b* in the second axial direction. Furthermore, as viewed in the axial direction, the first pressure receiving surface 41*d* is the annular surface between the outer periphery of the annular structure 41*b* and the outer periphery of the convex structure 41*c*, and the second pressure receiving surface 41*e* is the surface of the concave structure 41*a* facing the second surface 20*b*. Accordingly, the first pressure receiving surface 41*d* and the second pressure receiving surface 41*e* can be formed with a simple structure, and thus it is possible to achieve a configuration that adjusts the relief pressure while reducing a pressure required as the pilot pressure with a simple structure.

According to the first embodiment, as described above, the first piston member 41 includes the communication hole 41*f* to allow the first oil chamber 52*a* and the second oil chamber 52*b* to be connected to each other. Accordingly, the first oil chamber 52*a* and the second oil chamber 52*b* can be connected to each other through the communication hole 41*f*, and thus the hydraulic oil can be easily guided to the first oil chamber 52*a* and the second oil chamber 52*b*. Furthermore, the communication hole 41*f* is provided in the first piston member 41, and thus the complexity of the structure can be reduced or prevented as compared with a case in which a passage for guiding the hydraulic oil is provided in the housing 10 or the like.

According to the first embodiment, as described above, in the first piston member 41, the pressure receiving area of the first pressure receiving surface 41*d* is equal to the pressure receiving area of the second pressure receiving surface 41*e*. Accordingly, the force that acts on the first piston member 41 in the first axial direction due to the pressure of the hydraulic oil and the force that acts on the first piston member 41 in the second axial direction due to the pressure of the hydraulic oil can cancel each other, and thus it is possible to reduce or prevent the force that acts in the second axial direction against the pressure of the pilot oil. Consequently, the pilot pressure required to adjust the relief pressure can be reduced.

According to the first embodiment, as described above, the housing 10 includes, therein, the urging member chamber 53 connected to the outflow passage 101*b* and the back pressure chamber 54 connected to the outflow passage 101*b*, and the first piston member 41 includes the third pressure receiving surface 41*g* to receive a pressure (back pressure) in the first axial direction from the hydraulic oil in the back pressure chamber 54, and the fourth pressure receiving surface 41*h* to receive a pressure (back pressure) in the second axial direction from the hydraulic oil in the urging member chamber 53. Accordingly, regarding the back pressure of the hydraulic oil, the same or similar advantages as those of the pressure of the hydraulic oil in the oil chamber 52 can be achieved. That is, the force that acts on the first piston member 41 in the first axial direction due to the back pressure of the hydraulic oil can be opposed to the force that acts on the first piston member 41 in the second axial direction due to the back pressure of the hydraulic oil, and thus the force that acts in the second axial direction against the pressure of the pilot oil can be reduced. Consequently, the relief pressure can be adjusted while the pilot pressure is further reduced. Furthermore, the influence of the back pressure that acts on the first piston member 41 can be reduced, and thus the relief pressure can be accurately adjusted even when the back pressure varies rapidly.

According to the first embodiment, as described above, the first piston member 41 includes the annular structure 41*b* including the concave structure 41*a* that is recessed in the second axial direction and into which the end of the valve body 20 in the second axial direction is inserted, and the convex structure 41*c* having a smaller diameter than the annular structure 41*b* and protruding from the annular structure 41*b* in the second axial direction. Furthermore, the third pressure receiving surface 41*g* is the surface of the convex structure 41*c* in the second axial direction, and the fourth pressure receiving surface 41*h* is the surface of the annular structure 41*b* in the first axial direction. Accordingly, the third pressure receiving surface 41*g* and the fourth pressure receiving surface 41*h* can be formed with a simple structure, and thus it is possible to achieve a configuration that adjusts the relief pressure while reducing a pressure required as the pilot pressure with a simple structure.

According to the first embodiment, as described above, in the first piston member 41, the pressure receiving area of the third pressure receiving surface 41*g* is equal to the pressure receiving area of the fourth pressure receiving surface 41*h*. Accordingly, the force that acts on the first piston member 41 in the first axial direction due to the back pressure of the hydraulic oil and the force that acts on the first piston member 41 in the second axial direction due to the back pressure of the hydraulic oil can cancel each other, and thus the force that acts in the second axial direction against the pressure of the pilot oil can be reduced or prevented. Consequently, the relief pressure can be adjusted while the pilot pressure is still further reduced, and the relief pressure can be more accurately adjusted without depending on variations in the back pressure.

According to the first embodiment, as described above, the piston 40 includes the third piston member 43 between the first piston member 41 and the second piston member 42, the housing 10 includes, therein, the back pressure chamber 54 facing the surface of the third piston member 43 in the first axial direction and connected to the outflow passage 101*b*, and the area of the surface of the third piston member 43 in the first axial direction is smaller than the area of the pilot pressure receiving surface 42*b*. Accordingly, the area of the surface of the third piston member 43 in the first axial direction is smaller than the area of the pilot pressure receiving surface 42*b*, and thus even when the back pressure acts in the second axial direction against the pressure of the pilot oil, the influence of the back pressure that acts on the surface of the third piston member 43 in the first axial direction can be reduced.

Second Embodiment

A relief valve 200 according to a second embodiment is now described with reference to FIGS. 3 and 4. The same or similar configurations as those of the first embodiment are denoted by the same reference numerals, and detailed description thereof is omitted.

Figure 3:
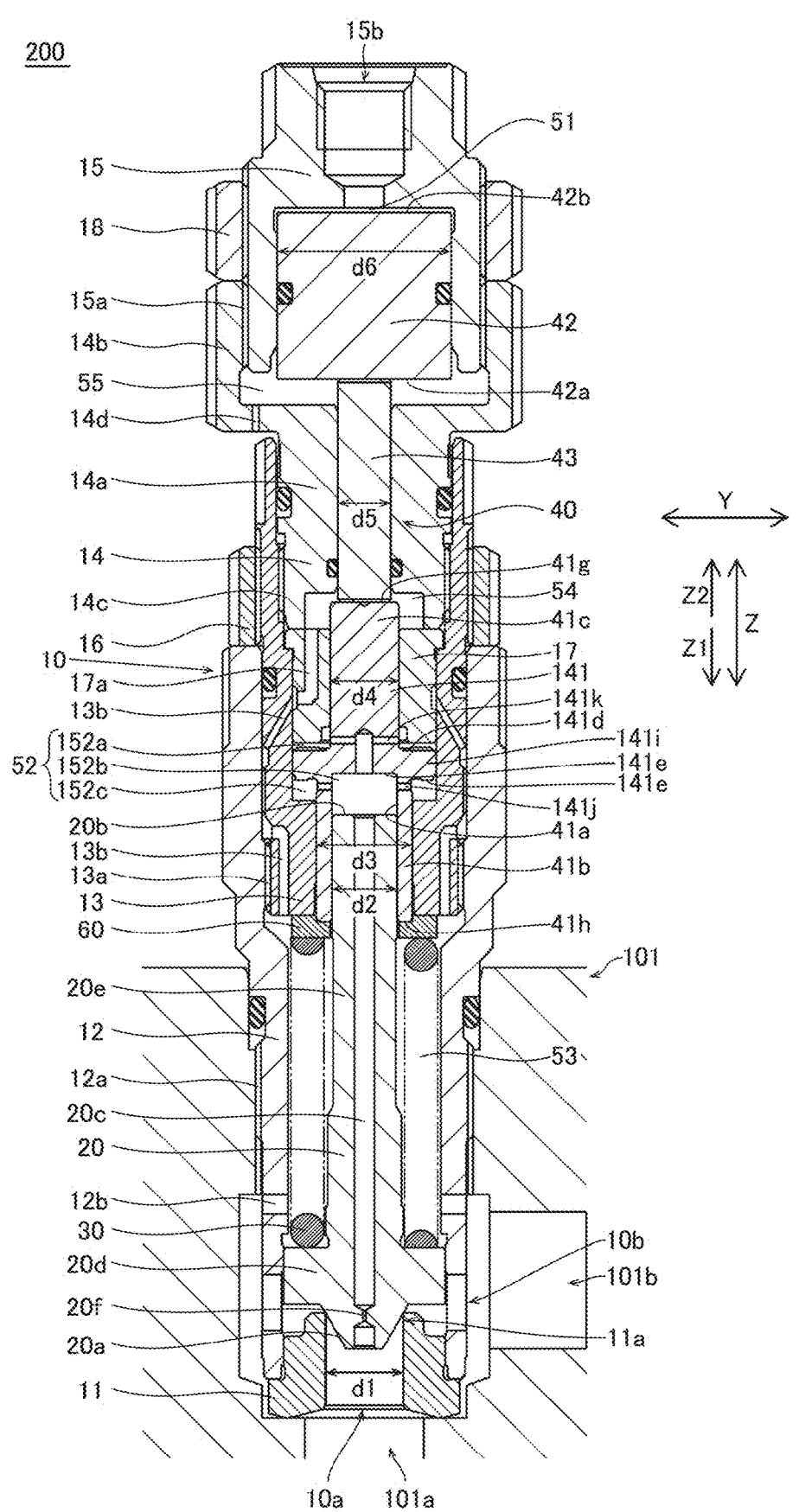
FIG. 3 is a longitudinal sectional view showing a relief valve according to a second embodiment.
Figure 4:
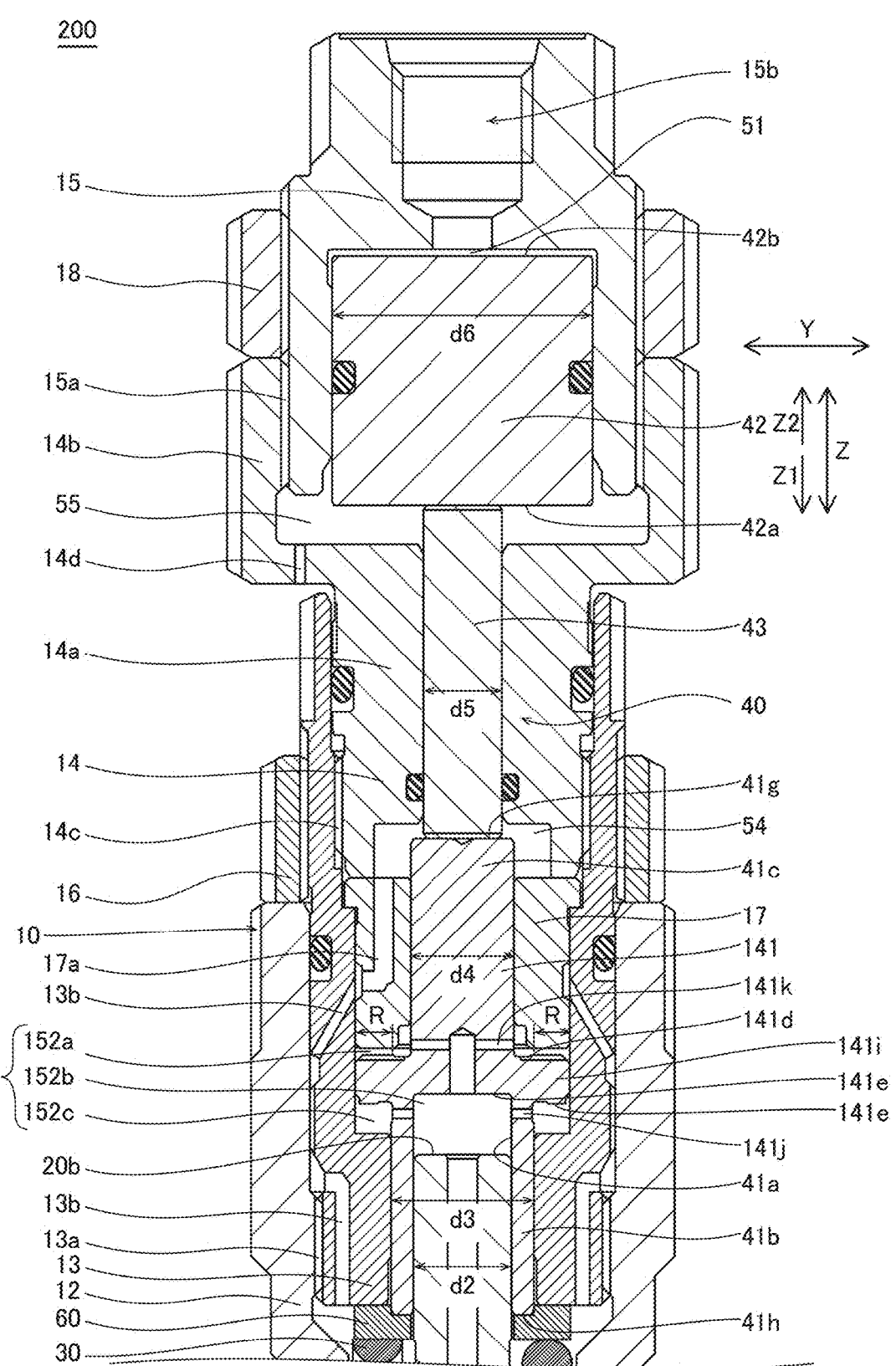
FIG. 4 is a partially enlarged view of FIG. 2.

As shown in FIGS. 3 and 4, the relief valve 200 according to the second embodiment includes a first piston member 141 in place of the first piston member 41 according to the first embodiment. In the second embodiment, the first piston member 141 divides an oil chamber 52 into a first oil chamber 152*a* and two second oil chambers 152*b* and 152*c*. The first piston member 141 includes a first pressure receiving surface 141*d* to receive a pressure in a first axial direction of an axial direction from hydraulic oil in the first oil chamber 152*a*, and second pressure receiving surfaces 141*e* to receive a pressure in a second axial direction of the axial direction from hydraulic oil in the second oil chambers 152*b* and 152*c*. Furthermore, the first piston member 141 includes an annular structure 41*b*, a convex structure 41*c*, and a flange 141*i*. The flange 141*i* has a larger diameter than the annular structure 41b and protrudes radially outward from the annular structure 41b. Furthermore, the flange 141i is slidably fitted into an inner hole of a housing member 13 in a liquid-tight manner.

The first oil chamber 152a is arranged in the second axial direction with respect to the flange 141i, and is defined by the flange 141i, a holding member 17, and the housing member 13. The second oil chamber 152b is located radially inward of the annular structure 41b, and is defined by a concave structure 41a and an end of a shaft 20e of a valve body 20 in the second axial direction. The second oil chamber 152c is located radially outward of the annular structure 41b and in the first axial direction with respect to the flange 141i, and is defined by the annular structure 41b, the flange 141i, and the housing member 13.

In the second embodiment, the first piston member 141 includes a first communication hole 141j that allows the second oil chamber 152b and the second oil chamber 152c to be connected to each other, and a second communication hole 141k that allows the first oil chamber 152a and the second oil chamber 152b to be connected to each other. The first communication hole 141j is provided in the annular structure 41b and passes through the annular structure 41b in a radial direction. The second communication hole 141k is provided in the convex structure 41c and passes through the convex structure 41c in the radial direction. Hydraulic oil flows into the second oil chamber 152b from an inflow passage 101a through a through passage 20c. Furthermore, hydraulic oil flows into the second oil chamber 152c from the second oil chamber 152b through the first communication hole 141j. Moreover, hydraulic oil flows into the first oil chamber 152a from the second oil chamber 152b through the second communication hole 141k.

In the second embodiment, the first oil chamber 152a faces an annular surface between the outer periphery of the annular structure 41b and the outer periphery of the convex structure 41c as viewed in an axial direction, and a surface of the flange 141i in the second axial direction. The second oil chamber 152b faces a surface of the concave structure 41a facing a second surface 20b. Furthermore, the second oil chamber 152c faces a surface of the flange 141i in the first axial direction on the radially outer side of the annular structure 41b. In the second embodiment, the first pressure receiving surface 141d is the annular surface and the surface of the flange 141i in the second axial direction. Furthermore, the second pressure receiving surfaces 141e is the surface of the concave structure 41a facing the second surface 20b and the surface of the flange 141i in the first axial direction.

In a range R (see FIG. 4) of the flange 141i that is radially outward of the annular structure 41b, the pressure of the hydraulic oil acts from both sides in the axial direction, and thus a force due to the pressure of the hydraulic oil is canceled. Therefore, in the first piston member 141, the pressure receiving area of the first pressure receiving surface 141d is equal to the pressure receiving areas of the second pressure receiving surfaces 141e, as in the first piston member 41 according to the first embodiment.

The remaining configurations of the second embodiment are similar to those of the first embodiment.

Advantages of Second Embodiment

According to the second embodiment, the following advantages are achieved.

According to the second embodiment, as described above, the first piston member 141 includes the first pressure receiving surface 141d and the second pressure receiving surfaces 141e. Accordingly, similarly to the first embodiment, the relief pressure can be adjusted while a pressure required as a pilot pressure is reduced. Furthermore, according to the second embodiment, as described above, a pilot pressure receiving surface 42b of a second piston member 42 in the second axial direction faces a pilot chamber 51, and an atmospheric open surface 42a of the second piston member 42 in the first axial direction faces an atmospheric open chamber 55. Accordingly, similarly to the first embodiment, a relief pressure can be adjusted while a pressure required as the pilot pressure is reduced, and even when a back pressure varies rapidly, the relief pressure can be accurately adjusted.

According to the second embodiment, as described above, the first piston member 141 is operable to divide the oil chamber 52 into the first oil chamber 152a and the two second oil chambers 152b and 152c, and the first piston member 141 further includes the flange 141i having a larger diameter than the annular structure 41b and protruding outward from the annular structure 41b, the first communication hole 141j to allow the second oil chamber 152b and the second oil chamber 152c to be connected to each other, and the second communication hole 141k to allow the first oil chamber 152a and the second oil chamber 152b to be connected to each other. Furthermore, the first oil chamber 152a faces the annular surface and the surface of the flange 141i in the second axial direction, the second oil chamber 152b faces the surface of the concave structure 41a facing the second surface 20b, and the second oil chamber 152c faces the surface of the flange 141i in the first axial direction on the outer side of the annular structure 41b. Accordingly, the annular surface and the surface of the flange 141i in the second axial direction can be the first pressure receiving surface 141d while the surface of the concave structure 41a facing the second surface 20b and the surface of the flange 141i in the first axial direction can be the second pressure receiving surface 141e, and thus the first pressure receiving surface 141d and the second pressure receiving surface 141e can be formed with a simple structure.

The remaining advantages of the second embodiment are similar to those of the first embodiment.

Third Embodiment

A relief valve 300 according to a third embodiment is now described with reference to FIG. 5. The same or similar configurations as those of the first and second embodiments are denoted by the same reference numerals, and detailed description thereof is omitted.

Figure 5:
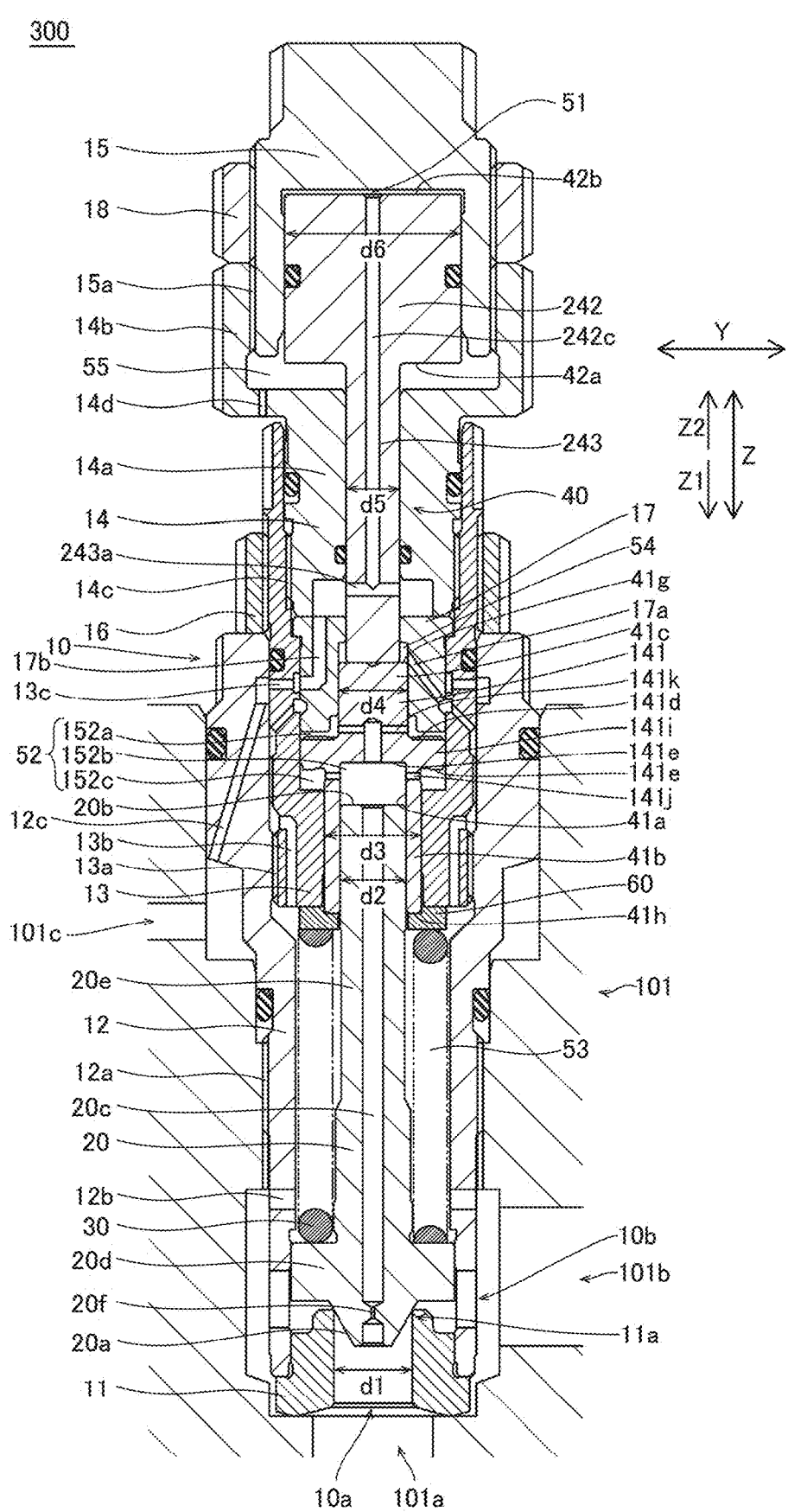
FIG. 5 is a longitudinal sectional view showing a relief valve according to a third embodiment.

As shown in FIG. 5, in the relief valve 300 according to the third embodiment, a pilot port 101c is provided in a valve block 101 unlike the first and second embodiments in which the pilot port 15b is provided in the housing member 15. In the third embodiment, the pressure of pilot oil is introduced from the pilot port 101c into a pilot chamber 51 through a passage 12c of a housing member 12, a passage 13c of a housing member 13, a passage 17b of a holding member 17, a passage 243a of a third piston member 243, and a passage 242c of a second piston member 242. In the relief valve 300 according to the third embodiment, the pilot port 101c is provided in the valve block 101, and thus unlike a case in which the pilot port 15b is provided in a housing member 15, piping that guides the pilot oil to the pilot port 15b can be eliminated.

In the third embodiment, the relief valve 300 includes the second piston member 242 and the third piston member 243 in place of the second piston member 42 and the third piston member 43 according to the first and second embodiments. The second piston member 242 and the third piston member 243 are integral and unitary with each other as a single component. Furthermore, the passages 242*c* and 243*b* for guiding the pilot oil to the pilot chamber 51 are provided inside the second piston member 242 and the third piston member 243. In the third embodiment, a back pressure chamber 54 is provided inside the holding member 17. The second piston member 242 is an example of a first pilot piston member.

The third piston member 243 is an example of a second pilot piston member.

The remaining configurations of the third embodiment are similar to those of the first and second embodiments.

Advantages of Third Embodiment

According to the third embodiment, the following advantages are achieved.

According to the third embodiment, as described above, the first piston member 141 includes the first pressure receiving surface 141*d* and the second pressure receiving surface 141*e*. Accordingly, similarly to the first and second embodiments, a relief pressure can be adjusted while a pressure required as a pilot pressure is reduced. Furthermore, according to the second embodiment, as described above, a pilot pressure receiving surface 42*b* of the second piston member 42 in a second axial direction of an axial direction faces the pilot chamber 51, and an atmospheric open surface 42*a* of the second piston member 42 in a first axial direction of the axial direction faces an atmospheric open chamber 55. Accordingly, similarly to the first and second embodiments, the relief pressure can be adjusted while a pressure required as the pilot pressure is reduced, and even when a back pressure varies rapidly, the relief pressure can be accurately adjusted.

The remaining advantages of the third embodiment are similar to those of the first and second embodiments.

Modified Examples

The embodiments disclosed this time must be considered as illustrative in all points and not restrictive. The scope of the present disclosure is not shown by the above description of the embodiments but by the scope of claims for patent, and all modifications (modified examples) within the meaning and scope equivalent to the scope of claims for patent are further included.

For example, while the example in which the effective pressure receiving area of the first piston member due to the first pressure receiving surface and the second pressure receiving surface is zero or about zero has been shown in each of the aforementioned first to third embodiments, the present disclosure is not limited to this. In the present disclosure, the effective pressure receiving area of the first piston member due to the first pressure receiving surface and the second pressure receiving surface may not be zero or about zero. For example, in an operating machine in which the pressure of the pilot oil is relatively high, even when the effective pressure receiving area of the first piston member due to the first pressure receiving surface and the second pressure receiving surface is not so small as zero or about zero (i.e., even when the pressure receiving surface of the first pressure receiving surface is not equal to the pressure receiving area of the second pressure receiving surface), the force canceling effect of the pressure of the hydraulic oil in the first piston member can be sufficiently exerted. In this case, the pressure receiving area of the first pressure receiving surface and the pressure receiving area of the second pressure receiving surface may differ by up to 30%, for example.

While the example in which the effective pressure receiving area of the first piston member due to the third pressure receiving surface and the fourth pressure receiving surface is zero or about zero has been shown in each of the aforementioned first to third embodiments, the present disclosure is not limited to this. In the present disclosure, the effective pressure receiving area of the first piston member due to the third pressure receiving surface and the fourth pressure receiving surface may not be zero or about zero. For example, in an operating machine in which the pressure of the pilot oil is relatively high, even when the effective pressure receiving area of the third piston member due to the third pressure receiving surface and the fourth pressure receiving surface is not so small as zero or about zero (i.e., even when the pressure receiving area of the third pressure receiving surface is not equal to the pressure receiving area of the fourth pressure receiving surface), the force canceling effect of the back pressure of the hydraulic oil in the third piston member can be sufficiently exerted. In this case, the pressure receiving area of the third pressure receiving surface and the pressure receiving area of the fourth pressure receiving surface may differ by up to 30%, for example.

While the example in which the first piston member includes the annular structure and the convex structure has been shown in the aforementioned first embodiment, and the example in which the first piston member includes the annular structure, the convex structure, and the flange has been shown in each of the aforementioned second and third embodiments, the present disclosure is not limited to this. In the present disclosure, the first piston member may have any shape as long as the same includes the first pressure receiving surface and the second pressure receiving surface.

While the example in which the first piston member, the second piston member, and the third piston member are separate members has been shown in the aforementioned first embodiment, and the example in which the second piston member and the third piston member are an integral member has been shown in each of the aforementioned second and third embodiments, the present disclosure is not limited to this. In the present disclosure, the first piston member and the second piston member may be an integral member, or the first piston member, the second piston member, and the third piston member may be an integral member.

While the example in which the surface of the second piston member in the first axial direction faces the atmospheric open chamber has been shown in each of the aforementioned first to third embodiments, the present disclosure is not limited to this. In the present disclosure, the surface of the second piston member in the first axial direction may face the back pressure chamber.

While the example in which the concave structure has the same diameter as d2 in the second oil chamber portion has been shown in each of the aforementioned first to third embodiments, the present disclosure is not limited to this. In the present disclosure, the concave structure may have a diameter larger than the diameter d2 in the second oil chamber portion. In this case, in a portion of the concave structure that is radially outward beyond the diameter d2, the pressure of the hydraulic oil acts on both sides in the axial direction, and thus a force due to the pressure of the hydraulic oil is canceled. Therefore, even in the first piston member including the concave structure having a diameter larger than the diameter d2 in the second oil chamber portion, the pressure receiving area of the first pressure receiving surface is equal to the pressure receiving area of the second pressure receiving surface, similarly to the first piston member according to the first to third embodiments.

The first pressure receiving surface and the second pressure receiving surface shown in each of the aforementioned first to third embodiments are merely examples, and the shapes, arrangement, etc. of the first pressure receiving surface and the second pressure receiving surface are not limited to these. These can be modified as desired. The first pressure receiving surface may be any surface as long as the same receives a pressure in the first axial direction from the hydraulic oil in the first oil chamber, and can include various surfaces such as a surface perpendicular to the axial direction, a surface inclined with respect to the axial direction, a stepped surface, and a curved surface. Alternatively, the first pressure receiving surface may be a combination of these surfaces. The second pressure receiving surface may be any surface as long as the same receives a pressure in the second axial direction from the hydraulic oil in the second oil chamber, and can include various surfaces such as a surface perpendicular to the axial direction, a surface inclined with respect to the axial direction, a stepped surface, and a curved surface. Alternatively, the second pressure receiving surface may be a combination of these surfaces.

The third pressure receiving surface and the fourth pressure receiving surface shown in each of the aforementioned first to third embodiments are merely examples, and the shapes, arrangement, etc. of the third pressure receiving surface and the fourth pressure receiving surface are not limited to these. These can be modified as desired. The third pressure receiving surface may be any surface as long as the same receives a pressure in the first axial direction from the hydraulic oil in the back pressure chamber, and can include e various surfaces such as a surface perpendicular to the axial direction, a surface inclined with respect to the axial direction, a stepped surface, and a curved surface. Alternatively, the third pressure receiving surface may be a combination of these surfaces. The fourth pressure receiving surface may be any surface as long as the same receives a pressure in the second axial direction from the hydraulic oil in the urging member chamber, and can include various surfaces such as a surface perpendicular to the axial direction, a surface inclined with respect to the axial direction, a stepped surface, and a curved surface. Alternatively, the fourth pressure receiving surface may be a combination of these surfaces.

DESCRIPTION OF REFERENCE CHARACTERS

10: housing
20: valve body
20a: first surface
20b: second surface
20c: through passage
30: urging member
40: piston
41, 141: first piston member
41a: concave structure
41b: annular structure
41c: convex structure
41d, 141d: first pressure receiving surface
41e, 141e: second pressure receiving surface
41f: communication hole
41g: third pressure receiving surface
41h: fourth pressure receiving surface 42, 242: second piston member (first pilot piston member)
42a: atmospheric open surface
42b: pilot pressure receiving surface
43, 243: third piston member (second pilot piston member)
51: pilot chamber
52: oil chamber
52a, 152a: first oil chamber
52b, 152b, 152c: second oil chamber
53: urging member chamber
54: back pressure chamber
55: atmospheric open chamber
100, 200, 300: relief valve
101a: inflow passage
101b: outflow passage
141i: flange
141j: first communication hole
141k: second communication hole

The invention claimed is:

1. A relief valve comprising:
a housing including a pilot chamber and an oil chamber therein;
a valve body configured to allow or block communication between an inflow passage into which a hydraulic oil flows and an outflow passage through which the hydraulic oil flows out, the valve body including a first surface facing the inflow passage, a second surface facing the oil chamber, and a through passage connecting the first surface to the second surface;
an urging member configured to urge the valve body toward the inflow passage; and
a piston including a first piston member configured to press the urging member using a pressure of a pilot oil in the pilot chamber to change an amount of deflection of the urging member; wherein
the first piston member is at least partially located within the oil chamber, and is operable to divide the oil chamber into a first oil chamber and a second oil chamber; and
the first piston member includes a first pressure receiving surface configured to receive a pressure in a first axial direction of an axial direction from the hydraulic oil in the first oil chamber, and a second pressure receiving surface configured to receive a pressure in a second axial direction of the axial direction from the hydraulic oil in the second oil chamber;
the first piston member includes:
an annular structure including a concave structure that is recessed in the second axial direction and into which an end of the valve body in the second axial direction is inserted; and
a convex structure having a smaller diameter than the annular structure and protruding from the annular structure in the second axial direction;
as viewed in the axial direction, the first pressure receiving surface is an annular surface between an outer periphery of the annular structure and an outer periphery of the convex structure; and
the second pressure receiving surface is a surface of the concave structure facing the second surface.

2. The relief valve according to claim 1, wherein the first piston member includes a communication hole to allow the first oil chamber and the second oil chamber to be connected to each other.

3. The relief valve according to claim 1, wherein the first piston member is operable to divide the oil chamber into the first oil chamber and two second oil chambers;

the first piston member further includes:

a flange having a larger diameter than the annular structure and protruding outward from the annular structure;

a first communication hole configured to allow one of the two second oil chambers to be connected to the other of the two second oil chambers; and a second communication hole configured to allow the first oil chamber to be connected to the one of the two second oil chambers;

the first oil chamber faces the annular surface and a surface of the flange in the second axial direction;

the one of the two second oil chambers faces the surface of the concave structure facing the second surface; and the other of the two second oil chambers faces a surface of the flange in the first axial direction on an outer side of the annular structure.

4. The relief valve according to claim 1, wherein in the first piston member, a pressure receiving area of the first pressure receiving surface is equal to a pressure receiving area of the second pressure receiving surface.

5. A relief valve, comprising:

a housing including a pilot chamber and an oil chamber therein;

a valve body configured to allow or block communication between an inflow passage into which a hydraulic oil flows and an outflow passage through which the hydraulic oil flows out, the valve body including a first surface facing the inflow passage, a second surface facing the oil chamber, and a through passage connecting the first surface to the second surface;

an urging member configured to urge the valve body toward the inflow passage; and a piston including a first piston member configured to press the urging member using a pressure of a pilot oil in the pilot chamber to change an amount of deflection of the urging member; wherein the first piston member is at least partially located within the oil chamber, and is operable to divide the oil chamber into a first oil chamber and a second oil chamber;

the first piston member includes a first pressure receiving surface configured to receive a pressure in a first axial direction of an axial direction from the hydraulic oil in the first oil chamber, and a second pressure receiving surface configured to receive a pressure in a second axial direction of the axial direction from the hydraulic oil in the second oil chamber;

the housing further includes, therein, an urging member chamber connected to the outflow passage and a back pressure chamber connected to the outflow passage; and the first piston member includes:

a third pressure receiving surface configured to receive a pressure in the first axial direction from the hydraulic oil in the back pressure chamber; and a fourth pressure receiving surface configured to receive a pressure in the second axial direction from the hydraulic oil in the urging member chamber.

6. The relief valve according to claim 5, wherein the first piston member includes:

an annular structure including a concave structure that is recessed in the second axial direction and into which an end of the valve body in the second axial direction is inserted; and a convex structure having a smaller diameter than the annular structure and protruding from the annular structure in the second axial direction;

the third pressure receiving surface is a surface of the convex structure in the second axial direction; and the fourth pressure receiving surface is a surface of the annular structure in the first axial direction.

7. The relief valve according to claim 5, wherein in the first piston member, a pressure receiving area of the third pressure receiving surface is equal to a pressure receiving area of the fourth pressure receiving surface.

8. A relief valve, comprising:

a housing including a pilot chamber and an oil chamber therein;

a valve body configured to allow or block communication between an inflow passage into which a hydraulic oil flows and an outflow passage through which the hydraulic oil flows out, the valve body including a first surface facing the inflow passage, a second surface facing the oil chamber, and a through passage connecting the first surface to the second surface;

an urging member configured to urge the valve body toward the inflow passage; and a piston including a first piston member configured to press the urging member using a pressure of a pilot oil in the pilot chamber to change an amount of deflection of the urging member; wherein the first piston member is at least partially located within the oil chamber, and is operable to divide the oil chamber into a first oil chamber and a second oil chamber;

the first piston member includes a first pressure receiving surface configured to receive a pressure in a first axial direction of an axial direction from the hydraulic oil in the first oil chamber, and a second pressure receiving surface configured to receive a pressure in a second axial direction of the axial direction from the hydraulic oil in the second oil chamber;

the housing further includes, therein, an atmospheric open chamber that is open to an atmosphere;

the piston further includes a second piston member arranged in the second axial direction with respect to the first piston member and configured to press and move the first piston member in the first axial direction; and the second piston member includes an atmospheric open surface facing the atmospheric open chamber in the first axial direction, and a pilot pressure receiving surface facing the pilot chamber in the second axial direction.

9. The relief valve according to claim 8, wherein the piston further includes a third piston member between the first piston member and the second piston member;

the housing further includes, therein, a back pressure chamber facing a surface of the third piston member in the first axial direction and connected to the outflow passage; and an area of the surface of the third piston member in the first axial direction is smaller than an area of the pilot pressure receiving surface.

23

24

10. A relief valve comprising:

a housing including a pilot chamber, an oil chamber, and an atmospheric open chamber therein;

a valve body configured to allow or block communication between an inflow passage into which a hydraulic oil flows and an outflow passage through which the hydraulic oil flows out, the valve body including a first surface facing the inflow passage, a second surface facing the oil chamber, and a through passage connecting the first surface to the second surface; an urging member configured to urge the valve body toward the inflow passage; and a piston including a first pilot piston member configured to change an amount of deflection of the urging member using a pressure of a pilot oil in the pilot chamber; wherein a surface of the first pilot piston member in a second axial direction of an axial direction faces the pilot chamber;

a surface of the first pilot piston member in a first axial direction of the axial direction faces the atmospheric open chamber;

the piston further includes a second pilot piston member arranged in the first axial direction with respect to the first pilot piston member;

the housing further includes, therein, a back pressure chamber facing a surface of the second pilot piston member in the first axial direction and connected to the outflow passage; and an area of the surface of the second pilot piston member in the first axial direction is smaller than an area of the first pilot piston member in the second axial direction.

\* \* \* \* \*